United States Patent [19]

Schutte

[11] 3,816,305

[45] June 11, 1974

[54] CLARIFICATION OF TAR SANDS MIDDLINGS WATER

[75] Inventor: Robert Schutte, Sherwood Park, Alberta, Canada

[73] Assignees: Gulf Oil Canada Limited; Canada-Cities Service, Ltd.; Imperial Oil, Limited; Atlantic Richfield Canada Ltd., ; a part interest to each

[22] Filed: Dec. 23, 1971

[21] Appl. No.: 211,762

[52] U.S. Cl.................... 210/42, 208/11, 210/59
[51] Int. Cl....................... B01d 21/01, C02b 1/20
[58] Field of Search............ 208/11; 210/42, 45, 47, 210/49, 51–53, 59, 60

[56] References Cited
UNITED STATES PATENTS

| | | | |
|---|---|---|---|
| 3,487,003 | 12/1969 | Bailie et al............................ | 208/11 |
| 3,502,575 | 3/1970 | Hepp et al......................... | 210/60 X |
| 3,526,585 | 9/1970 | Camp.................................... | 208/11 |
| 3,607,720 | 9/1971 | Paulson................................ | 208/11 |

*Primary Examiner*—Samih N. Zaharna
*Assistant Examiner*—Thomas G. Wyse
*Attorney, Agent, or Firm*—Ernest Peter Johnson

[57] ABSTRACT

A process for treating tar sands to cause flocculation or coagulation of the clays and other small solids particles present in middlings and tailings streams produced from the hot water process is disclosed. The process involves the addition of an acid to the water to accelerate clarification of the water and reduce required sludge settling pond area.

1 Claim, No Drawings

CLARIFICATION OF TAR SANDS MIDDLINGS WATER

BACKGROUND OF THE INVENTION

This invention pertains to a process for treating hydrocarbon containing minerals. More particularly, the invention is directed to a process for clarifying middlings water produced during the processing of Canadian tar sands.

Tar sands which are principally located in the Athabasca region of Alberta, Canada, are presently used as a supplement source of synthetic crude oils, and it is hoped that in the future, its importance as a source of oil would increase. The tar sands are contained in beds in mixture with sand and other inorganic minerals. Typically, these sands contain from about 6 to about 20 percent bitumen (also referred to herein as oil), from about 1 to about 10 percent of water, and from about 70 to about 90 percent of mineral solids. The specific gravity of the bitumen varies from about 1.0 to about 1.05 and has an API gravity of about 8.0. This value for specific gravity, as well as that of the specific gravity of any other material given herein is taken at 60°F. All percentage values are on a weight basis unless otherwise specified.

The major portion by weight of the mineral solids in bituminous sand is quartz sand having a particle size greater than about 45 microns and less than 2,000 microns. The term "mineral" is used herein to describe material of inorganic origin such as sand, clay and the like, as distinguished from material of organic origin such as coke. For the most part, the remaining mineral solid material has a particle size of less than about 45 microns. This smaller size mineral solid material is referred to as fines. The fines contain clay and silt, including some very small particles of sand. The fines content typically varies from about 10 to about 30 percent by weight of the total solid mineral content of bituminous sand. However, it is not uncommon for the ingredients of bituminous sand to vary from the above mentioned concentrations.

Various methods are known for separating bitumen from bituminous sand. Some of these methods involve the use of water for preparing a slurry at a temperature above about 75°F. Most of the coarse sand and portions of the fines are separated from the slurry by various means, such as settling, to recover an emulsion or froth which contains some of the fines and quantities of coarse sand. Such an emulsion or froth is simply referred to herein as froth. One well known method for preparing such froth is often referred to as the "hot water process." In the hot water method the bituminous sand is slurried with steam and hot water at about 180°F. and the pulp is then agitated with a stream of circulating hot water and carried to a separation cell maintained at an elevated temperature of about 180°F. In the separation cell, entrained air causes the bitumen to rise to the top of the cell in the form of a froth. The froth contains air with the emulsion of bitumen, water and mineral solids. The mineral solids are extremely difficult to separate from the bitumen and unless the froth is further treated it will generally contain at least 3 percent of mineral solids. The solids and water, called tailings water, remaining may also be processed.

The bituminous emulsion or froth, such as that obtained by the above described procedures, often contains from about 17 to about 60 percent water, 3 to about 20 percent of mineral solids and from about 30 to about 80 percent bitumen. Usually, however, the bituminous emulsion or froth will contain, by weight, from about 4 to about 12 percent mineral solids and about 35 to about 70 percent of bitumen. Separation of water and mineral solids from the froth is necessary for most ultimate uses of the bitumen. However, the separation of solids from the froth is difficult.

The hot water process not only results in the separation of the bitumen from the tar sands, but also in the classification and separation of the minerals contained therein from the water, called middlings water. Classification of middlings water, both to recover valuable mineral by-products and to provide a water which may be returned to native waters is an extremely costly and time-consuming process. Generally, the waters are introduced into sludge settling ponds where approximately three months are required for untreated material to settle to a contamination level where clarified water may be returned to the source. Organic flocculating agents have been utilized to remove the clays and fine solids from the water prior to its discharge into the native water, but have proven far too costly and inefficient an accelerator of the clarification process. Inorganic agents such as calcium chloride leave residues in the waters which are harmful to the overall clarification process.

What is required is an economical method to clarify middlings water, and in some instances tailings water, to provide a clarified water suitable for return to the native water source.

It is an object of the present invention to provide a method for the clarification of tailings and middlings water produced during the processing of tar sands minerals.

It is a further object of the present invention to provide a method wherein the area of sludge settling ponds, required for clarification of water produced during the hot water processing of tar sands, may be reduced.

It is still a further object of the present invention to provide an additive for the flocculation and coagulation of tailings and middlings water in order to accelerate the clarification of water introduced into sludge settling ponds.

With these and other objects in mind, the present invention may be more readily understood through referral to the following discussion.

SUMMARY OF THE INVENTION

The objects of the present invention are accomplished through utilization of a process for the clarification of tailings and middlings waters produced in conjunction with the hot water treatment on tar sands. In general, the process comprises the introduction of sulfuric acid into the water to reduce the pH to within the range 5.5–7.0 to cause flocculation and coagulation of the clays and small solids contained therein. The product is allowed to stand for several days to allow the pH to recover to the substantially neutral condition and the solids from the middlings water.

The process may further comprise stirring the treated tailings or middlings water until a pH equal to about 7.0 is obtained wherein the water may be returned to the native water source subsequent to clarification and neutralization.

DETAILED DESCRIPTION OF THE INVENTION

It has been found that flocculation or coagulation of clay in small solid particles occurs when sulfuric acid is added to the waters containing up to about 10 per cent solids. The amount of acid required is generally between about 2.0 and $5.74 \times 10^{-4}$ grams per gram of solid material contained within the middlings water. In general, the acid concentration is adjusted so that immediately after addition, the pH of the mixture or treated waters is within the range 5.5 to 6.5. The solids contained within the middlings water, which is treated with acid, coagulate through flocculation and settle rapidly. In general, the treated middlings water act to reduce the sludge settling pond area required. The area of the sludge settling pond is greatly reduced through the introduction of acid such that retention times of middlings water in the sludge settling pond is curtailed to a small percentage of the total time necessary without treatment.

It has now been discovered that the pH of the clarified water layer, if left in contact with the sludge increases again so that after about 1 to 7 days, depending on concentration of acid, solids content, etc., a pH of about 7.0 or neutrality is obtained. In addition to solids removal, a decrease in surface active compounds and organic residues normally present in middling streams from the hot water process may be observed. The high pH and low solid and surface active compounds or contamination make the water suitable for reuse in the process or for discharge into the native waters, for example a river or underground source from which the water, was originally obtained for the hot water contact.

The versatility of the process of the present invention may be most easily understood by referral to the following examples.

EXAMPLE 1

To investigate the time dependence of pH, two sets of examples of middlings, and a tailings water treatment were studied. Various amounts of sulfuric acid were added to study the clarification rate. The initial set was allowed to settle naturally with the second set (those being the even number samples in Table I) being stirred after each pH measurement. Table I relates the amount of acid added and the pH of the supernatant fluid as a function of time for each sample. After seven days settling, the pH of all the samples was found to have a pH over the neutral value.

Table II represents middlings samples obtained from a semicontinuous unit run in which 0.03 weight percent sodium hydroxide, an often used processing chemical, was first added in the process. It can be seen that after five days' settling, the pH's of the clarified portion of all samples were also returned to a neutral value. Table III represents a set of tailings water samples containing about 40 percent solids obtained from a non-chemical run in which 1.0 to $5.82 \times 10^{-4}$ grams of sulfuric acid per gram of solids was utilized in order to depict a time dependent rise of pH to the basic side of the pH scale. A more rapid return of the pH to a basic value was found in the stirred rather than the non-stirred samples. The stirred samples also showed that the amount of change of the middlings and tailings water brought about with the addition of acid was permanent, even when the pH was initially basic excellent clarification was experienced.

EXAMPLE 2

The clarified portions of the samples of Table I were centrifuged after 170 hours. The specific conductance, ultraviolet (UV) spectrum, surface tension and pH were measured. The results are given in Table IV. Color of the samples was light yellow (Sample M1) to clear (Samples M7 and M8). An increase in acid gave a small increase (20 percent) in conductance, a decrease in UV absorbance by a factor of 2.5 and an increase in surface tension by about 6 percent.

The supernatant liquid from several sludge settling experiments was combined to give 6 liters of clarified water of a yellowish appearance and a pH of 5.5. This water was used in small batch extraction tests to show that the acid-clarified water did not adversely affect the oil recovery and the solids content of the froth, but increased the water content of the froth. The latter was found to be corrected by addition of 0.02

TABLE I

VARIATION OF pH WITH TIME

| Sample No. | H$_2$SO$_4$ ml | g/g Solids $\times 10^{-4}$ | Hours after addition of acid | | | | | | | |
|---|---|---|---|---|---|---|---|---|---|---|
| | | | 2 | 5 | 12 | 23 | 29 | 47 | 76 | 167 |
| | (0.13N) | Middlings from a non-chemical run. 5.6 wt. % Solids. 500 ml Samples | | | | | | | | |
| M1 | 1 | | 6.90 | 6.90 | 7.30 | 7.14 | 7.00 | 7.10 | 7.35 | 7.44 |
| M2 | 1 | 1.92 | 6.93 | 6.65 | 7.11 | 7.17 | 7.07 | 7.20 | 7.23 | 7.76 |
| M3 | 2 | | 6.67 | 6.52 | 6.92 | 6.93 | 6.98 | 6.82 | 7.08 | 7.52 |
| M4 | 2 | 3.91 | 6.78 | 6.60 | 6.97 | 6.99 | 7.00 | 7.18 | 7.10 | 7.80 |
| M5 | 4 | | 6.53 | 6.51 | 6.79 | 6.68 | 6.70 | 6.81 | 7.00 | 7.18 |
| M6 | 4 | 7.48 | 6.56 | 6.50 | 6.79 | 6.90 | 6.80 | 6.98 | 6.92 | 7.30 |
| M7 | 8 | | 6.10 | 6.28 | 6.43 | 6.23 | 6.48 | 6.40 | 6.75 | 6.97 |
| M8 | 8 | 15.0 | 6.14 | 6.22 | 6.60 | 6.63 | 6.29 | 6.58 | 6.85 | 7.11 |
| Blank | — | — | 7.30 | 7.10 | 7.48 | 7.40 | 7.32 | 7.42 | 7.44 | 7.81 |

TABLE II

VARIATION OF pH WITH TIME

| Sample No. | H$_2$SO$_4$ ml | g/g Solids $\times 10^{-4}$ | pH Hours after addition of acid | | | | | | | |
|---|---|---|---|---|---|---|---|---|---|---|
| | | | 1 | 9 | 19 | 25 | 43 | 49 | 121 | 140 | 547 |
| | (0.382N) | Middlings contained .03 wt % NaOH. 12.5 wt % Solids | | | | | | | | |
| 1 | 2 | | 8.05 | 8.0 | 8.0 | 7.87 | 8.23 | 8.05 | 8.07 | 8.05 | 8.00 |
| 2 | 2 | 5.64 | 8.18 | 8.0 | 8.09 | 7.72 | 8.20 | 7.88 | 8.10 | 8.10 | |
| 3 | 4 | | 7.66 | 7.52 | 7.70 | 7.83 | 8.04 | 7.77 | 7.20 | 8.07 | 8.00 |

TABLE II—Continued

VARIATION OF pH WITH TIME

| Sample No. | H$_2$SO$_4$ ml | g/g Solids × 10$^{-4}$ | pH Hours after addition of acid | | | | | | | | |
|---|---|---|---|---|---|---|---|---|---|---|---|
| | | | 1 | 9 | 19 | 25 | 43 | 49 | 121 | 140 | 547 |
| 4 | 4 | 11.19 | 7.72 | 7.61 | 7.52 | 7.57 | 8.07 | 7.90 | 7.50 | 8.10 | |
| 5 | 6 | | 7.09 | 7.1 | 7.60 | 7.59 | 7.70 | 7.70 | 7.09 | 7.70 | 7.80 |
| 6 | 6 | 16.94 | 7.10 | 7.0 | 6.94 | 7.0 | 7.80 | 7.70 | 7.17 | 7.80 | |
| 7 | 8 | | 6.60 | 7.13 | 7.17 | 7.20 | 6.83 | 6.80 | 7.48 | 7.30 | 7.60 |
| 8 | 8 | 22.04 | 6.66 | 6.52 | 6.65 | 6.65 | 7.35 | 7.00 | 7.30 | 7.32 | |
| Blank | | | 8.79 | 8.70 | 8.49 | 8.38 | 8.17 | 8.02 | 8.26 | 8.20 | |

TABLE III

VARIATIONS OF pH WITH TIME

| Sample No. | H$_2$SO$_4$ ml | g/g Solids × 10$^{-4}$ | pH Hours after addition of acid | | | | | | | | |
|---|---|---|---|---|---|---|---|---|---|---|---|
| | | | 2 | 5 | 12 | 23 | 29 | 47 | 76 | 167 | 318 |
| | (1.0N) | Tailings from a non-chemical run. 40 wt % Solids. 500 ml Samples | | | | | | | | | |
| T1 | 1 | | 6.27 | 6.10 | 6.49 | 6.68 | 6.97 | 6.88 | 6.80 | 7.38 | 7.70 |
| T2 | 1 | 1.56 | 6.33 | 6.18 | 6.48 | 6.54 | 6.81 | 6.64 | 6.58 | 7.47 | 7.80 |
| T3 | 2 | | 5.80 | 5.81 | 6.03 | 6.01 | 6.18 | 6.13 | 6.41 | 6.94 | 7.24 |
| T4 | 2 | 3.08 | 5.90 | 5.98 | 6.17 | 6.20 | 6.30 | 6.35 | 6.42 | 7.19 | 7.54 |
| T5 | 4 | | 5.52 | 5.57 | 5.40 | 5.21 | 5.39 | 4.90 | 5.11 | 5.50 | 6.20 |
| T6 | 4 | 5.74 | 5.53 | 5.57 | 5.54 | 5.52 | 5.71 | 5.19 | 5.40 | 5.81 | 6.56 |
| T7 | 8 | | 5.13 | 5.16 | 5.08 | 4.70 | 4.80 | 4.31 | 4.53 | 4.42 | 3.98 |
| T8 | 8 | 11.81 | 5.14 | 5.22 | 5.30 | 5.01 | 5.21 | 4.58 | 4.64 | 4.43 | 4.30 |
| Blank | | | 6.88 | 7.10 | 7.33 | 7.20 | 7.13 | 7.23 | 6.97 | 7.50 | 7.62 | wt. percent NaOH to the slurry.

TABLE IV

PROPERTIES OF CENTRIFUGED CLARIFIED WATER

| Sample | Specific Conductance × 10$^{-4}$ | UV Absorbance at 250 nm | Surface Tension (relative values) | pH |
|---|---|---|---|---|
| M1 | 3.98 | 0.79 | 68.1 | 7.55 |
| M2 | 4.32 | 0.49 | 68.3 | 7.58 |
| M3 | 4.35 | 0.55 | 69.7 | 7.52 |
| M4 | 4.41 | 0.40 | 70.9 | 7.50 |
| M5 | 4.75 | 0.42 | 72.2 | 7.44 |
| M6 | 4.88 | 0.36 | 70.5 | 7.56 |
| M7 | 5.12 | 0.33 | 70.7 | 7.45 |
| M8 | 5.44 | 0.29 | 72.7 | 7.60 |
| Blank | 4.27 | 1.69 | 68.7 | 7.58 |
| Distilled Water | 1.66 × 10$^{-6}$ | — | 74.4 | — |

EXAMPLE 3

To discover the commercial significance of the process of the present invention, the clarification of middlings water from a non-chemical run and chemical run involving 0.03 weight percent sodium hydroxide were studied. Costs per gallon of clarified water present were analyzed in order to determine the significance of the process of the present invention, utilizing the acid and the natural tendency of the middlings water and solids contained therein in order to re-neutralize the solution after acid addition and subsequent coagulation and flocculation have occurred. Table V relates the rate of clarification of the middlings from a non-chemical run showing the cost of about one cent per thousand gallons clarified water utilizing sulfuric acid wherein the stream is initially at a neutral pH level. Table VI depicts a cost of from about 9 to about 18 cents per thousand gallons for clarification of middlings from a chemical run in hich a slightly basic solution is subjected to clarification. Therefore, the utilization of the process of the present invention with other chemical treatments is possible, but may be a deterrent in providing an economic means for clarifying the waters to an essentially neutral solution with the precipitated sludge removed therefrom.

TABLE V

CLARIFICATION OF MIDDLINGS FROM A NON-CHEMICAL RUN
500 ml Samples, 18 hrs.

| Sample | Wt % Solids | 0.1N ml | H$_2$SO$_4$ mg | Water Clarified ml | Water Clarified % | Residue after evaporation of supernatant liquid (wt. %) | c/1000 gallons (Imperial) clarified water |
|---|---|---|---|---|---|---|---|
| 1 | 3.14 | 2.1 | 10.3 | 156 | 32 | 0.303 | 1.06 |
| 2 | 4.76 | 3.1 | 15.2 | 190 | 39 | 0.164 | 1.28 |
| 3 | 6.34 | 4.1 | 20.1 | 245 | 50 | 0.114 | 1.31 |
| 4 | 7.94 | 5.0 | 24.5 | 265 | 55 | 0.096 | 1.48 |

TABLE VI

CLARIFICATION OF MIDDLINGS FROM A CHEMICAL RUN (18 hrs) (.03 wt % NaOH)

| Sample | Wt % Solids | 0.382N ml | $H_2SO_4$ mg | Water Clarified ml | Water Clarified % | Residue after evaporation of supernatant liquid (wt %) | c/1000 gallons (Imperial) clarified water |
| --- | --- | --- | --- | --- | --- | --- | --- |
| 1 | 12.5 | 2 | 37.44 | 69 | 14 | .078 | 8.70 |
| 2 | do. | 4 | 74.87 | 78 | 16 | .090 | 15.40 |
| 3 | do. | 6 | 112.31 | 102 | 21 | .095 | 17.70 |
| 4 | do. | 8 | 149.74 | 188 | 40 | .109 | 12.80 |

EXAMPLE 4

To disclose the versatility of the process of the present invention, tailings waters were treated by the addition of $H_2SO_4$ in order to clarify the waters. Table VII depicts the amounts of acid and time required to return the pH of the waters to equal to or about 7.0.

TABLE VII

TAILINGS WATER TREATMENT

| Sample | Weight g (acid excluded) | Weight Solids g | 0.255N $H_2SO_4$ ml | $H_2SO_4$ g × $10^3$ | g $H_2SO_4$ per g solids × $10^4$ | 40 min. | 15 hrs. 40 min. | 38 hrs. 25 min. | 68 hrs. 20 min. | 165 hrs. (one week) |
| --- | --- | --- | --- | --- | --- | --- | --- | --- | --- | --- |
| 51 | 515 | 50.06 | 3 | 37.5 | 7.5 | 6.52 | 6.89 | 6–70 | 7.08 | 7.58 |
| 52 | 518 | 50.35 | 4 | 50.0 | 10.0 | 6.30 | 6.68 | 7.19 | 7.05 | 7.28 |
| 53 | 508 | 49.38 | 5 | 62.5 | 12.5 | 6.07 | 6.67 | 6.91 | 6.83 | 7.20 |
| 54 | 514 | 49.96 | 6 | 75.0 | 15.0 | 5.97 | 6.43 | 6.53 | 6.69 | 7.02 |
| — | 527 | 51.22 | — | — | — | 7.59 | 7.48 | 7.50 | 7.91 | 7.98 |

The reasons for the return of the acid treated water to a neutral pH, wherein the addition of basic solutions for clarification do not readily return to a neutral pH, are not definitely known. It is believed that calcium compounds in the clay may be responsible for the recovery of the clarified liquid to an essentially neutral condition. Although the sludge may be left in a somewhat less dense form than ordinary settled fines, the net effect of the invention would appear to be the reduction of the sludge settling pond area necessary. This area being critical for environmental control and retention time of middlings water for use within the hot water process.

As indicated in the data, water clarified in accordance with the invention usually requires only 3 to 7 days to recover pH to essentially neutral condition. This compares with approximately 3 months required for untreated material to settle to the point where clarified water may be returned to a river. The invention is considered most useful in connection with treatment of primary separator middlings water and secondary separator tailings water. While the best data that has been indicated is for secondary tailings, the most advantageous use in commercial aspects would probably be with the primary middlings. The acid utilized are not critical and as suggested, may be selected from the group consisting of hydrochloric, nitric, sulfuric and acetic, with sulfuric generally being commercially available in large quantities at an economic rate, being preferred. Any concentration of any acid may be used. It has been found that the process of the present invention is preferably utilized when the pH of the treated solution is less than about 6.5, with pH's as low as 5.5 being obtainable and allowing neutralization through subsequent stirring of the treated middlings water. Therefore, through utilization of the process of the present invention, tailings and middlings water may be clarified through the introduction of an acid into the water in order to cause flocculation and coagulation of the clays and small solids particles occurring therein so as to significantly reduce the area of sludge settling ponds required and the retention time of the water therein for the clarification and return of the water to the native source.

While the invention has been described above with respect to certain embodiments thereof, it will be understood by those skilled in the art that various changes and modifications may be made without departing from the spirit and scope of the invention as set forth herein.

Therefore, we claim:

1. A process for the clarification and neutralization of tailings and middlings water produced in conjunction with the "hot water" treatment of tar sands which consists essentially of:
    a. reducing the pH of the tailings and middlings water to within the range 5.5 to 6.5 by adding 2.0 to 5.74 × $10^{-4}$ grams of sulfuric acid per gram of solid material contained within the water, to the water, to cause flocculation and coagulation of clays and small solids contained therein,
    b. holding resultant acid-treated water containing the solids in a sludge settling pond in contact with the settling and settled solid sludge for a period of time of at least 3 days, said period of time being also at least sufficient to permit the pH of the water to recover to substantially neutral condition or above, and
    c. recovering the clarified water of at least pH 7.0 from said settling pond at the end of said period.

* * * * *